United States Patent
Hauser (10) Patent No.: US 10,303,722 B2
(45) Date of Patent: May 28, 2019

(54) SYSTEM AND METHOD FOR CONTENT SELECTION FOR WEB PAGE INDEXING

(75) Inventor: Robert R Hauser, Frisco, TX (US)

(73) Assignee: ORACLE AMERICA, INC., Redwood Shores, CA (US)

( * ) Notice: Subject to any disclaimer, the term of this patent is extended or adjusted under 35 U.S.C. 154(b) by 830 days.

(21) Appl. No.: 12/435,777

(22) Filed: May 5, 2009

(65) Prior Publication Data

US 2010/0287462 A1    Nov. 11, 2010

(51) Int. Cl.
*G06F 16/951* (2019.01)
*G06F 16/81* (2019.01)

(52) U.S. Cl.
CPC ............ *G06F 16/951* (2019.01); *G06F 16/81* (2019.01)

(58) Field of Classification Search
CPC ......... G06F 17/30011; G06F 17/30613; G06F 17/30867; G06F 16/951; G06F 16/81; G06Q 30/0255
USPC ......................................... 707/711, 715, 732
See application file for complete search history.

(56) References Cited

U.S. PATENT DOCUMENTS

| | | | |
|---|---|---|---|
| 6,581,072 B1 | 6/2003 | Mathur et al. | |
| 6,826,567 B2* | 11/2004 | Tada et al. | |
| 6,848,108 B1 | 1/2005 | Caron | |
| 7,051,042 B2 | 5/2006 | Krishnaprasad et al. | |
| 7,877,421 B2* | 1/2011 | Berger et al. | 707/809 |
| 8,327,385 B2 | 12/2012 | Hauser | |
| 8,751,628 B2 | 6/2014 | Hauser | |
| 8,832,257 B2 | 9/2014 | Hauser | |
| 9,330,395 B2 | 5/2016 | Hauser | |
| 9,336,191 B2 | 5/2016 | Hauser | |
| 9,442,621 B2 | 9/2016 | Hauser | |
| 9,507,870 B2 | 11/2016 | Hauser | |
| 9,940,391 B2 | 4/2018 | Hauser | |
| 2003/0195877 A1* | 10/2003 | Ford | G06F 17/30705 |
| 2004/0006742 A1 | 1/2004 | Slocombe | |

(Continued)

OTHER PUBLICATIONS

Florian Mueller, Andrea Lockerd, "Cheese: Tracking Mouse Movement Activity on Websites, a Tool for User Modeling", Conference on Human Factors in Computing Systems, CHI '01 extended abstracts on Human factors in computing systems, Seattle, Washington, Session: Short talks: of mice and measures, pp. 279-280, Year of Publication: 2001, ISBN: 1-58113-340-5, MIT Media Lab, 2001, Cambridge, MA 02139 USA.

(Continued)

*Primary Examiner* — Arpan P. Savla
*Assistant Examiner* — Soheila (Gina) Davanlou
(74) *Attorney, Agent, or Firm* — Kilpatrick Townsend & Stockton, LLP (57) ABSTRACT

An indexing system for documents such as web pages divides a document into elements, such as document object model elements. User attention data from prior interactions with the document are analyzed to determine those elements of a document that satisfy a threshold requirement of user attention. Elements meeting the user attention threshold requirement are added to a set of indexable content for the document. Furthermore, document sections are determined based on attention data and each section is indexed separately. Indexing is per section and based only on the indexable content, thereby enhancing the index relevance, increasing the efficiency of search engines and reducing spamdexing.

20 Claims, 7 Drawing Sheets

(56) References Cited

U.S. PATENT DOCUMENTS

| | | | |
|---|---|---|---|
| 2004/0024812 A1* | 2/2004 | Park | G06F 17/30893 709/203 |
| 2004/0260679 A1 | 12/2004 | Best et al. | |
| 2005/0108636 A1 | 5/2005 | Sylthe et al. | |
| 2005/0114316 A1* | 5/2005 | Fontoura et al. | 707/3 |
| 2006/0004725 A1 | 1/2006 | Abraido-Fandino | |
| 2006/0026147 A1 | 2/2006 | Cone et al. | |
| 2006/0136589 A1* | 6/2006 | Konig | G06F 17/30867 709/224 |
| 2006/0161532 A1* | 7/2006 | Wen et al. | 707/3 |
| 2006/0248057 A1 | 11/2006 | Jacobs et al. | |
| 2007/0016553 A1* | 1/2007 | Dumais | H04L 51/34 |
| 2007/0050338 A1 | 3/2007 | Strohm et al. | |
| 2007/0239701 A1 | 10/2007 | Blackman et al. | |
| 2007/0282825 A1 | 12/2007 | Toub | |
| 2008/0016087 A1* | 1/2008 | Zhang et al. | 707/100 |
| 2008/0046218 A1 | 2/2008 | Dontcheva et al. | |
| 2008/0228910 A1* | 9/2008 | Petri | 709/224 |
| 2008/0270375 A1 | 10/2008 | Nanduri et al. | |
| 2009/0063500 A1* | 3/2009 | Zhai | G06F 17/30911 |
| 2009/0106221 A1 | 4/2009 | Meyerzon et al. | |
| 2009/0164447 A1* | 6/2009 | Daya | 707/5 |
| 2009/0276399 A1 | 11/2009 | Irmak et al. | |
| 2009/0287645 A1 | 11/2009 | Dasdan et al. | |
| 2010/0049760 A1* | 2/2010 | Rousseau et al. | 707/692 |
| 2010/0100543 A1* | 4/2010 | Brady | 707/732 |
| 2010/0100551 A1 | 4/2010 | Knauft et al. | |
| 2010/0114706 A1* | 5/2010 | Kosuru | 705/14.55 |
| 2010/0153836 A1 | 6/2010 | Krassner et al. | |
| 2010/0169792 A1 | 7/2010 | Ascar et al. | |
| 2010/0287028 A1 | 11/2010 | Hauser | |
| 2010/0287134 A1 | 11/2010 | Hauser | |
| 2010/0287152 A1 | 11/2010 | Hauser | |
| 2012/0047122 A1 | 2/2012 | Hauser | |
| 2012/0047431 A1 | 2/2012 | Hauser | |
| 2012/0191691 A1 | 7/2012 | Hansen | |

OTHER PUBLICATIONS

U.S. Appl. No. 12/435,767, Advisory Action dated Aug. 31, 2012, 3 pages.
U.S. Appl. No. 12/435,767, Advisory Action dated Jun. 20, 2013, 3 pages.
U.S. Appl. No. 12/435,767, Corrected Notice of Allowability dated Jan. 15, 2016, 5 pages.
U.S. Appl. No. 12/435,767, Final Office Action dated Mar. 3, 2014, 16 pages.
U.S. Appl. No. 12/435,767, Final Office Action dated Jul. 31, 2015, 17 pages.
U.S. Appl. No. 12/435,767, Final Office Action dated Mar. 25, 2013, 25 pages.
U.S. Appl. No. 12/435,767, Final Office Action dated May 31, 2012, 32 pages.
U.S. Appl. No. 12/435,767, Non-Final Office Action dated Jan. 2, 2015, 17 pages.
U.S. Appl. No. 12/435,767, Non-Final Office Action dated Jul. 18, 2013, 24 pages.
U.S. Appl. No. 12/435,767, Non-Final Office Action dated Oct. 19, 2017, 25 pages.
U.S. Appl. No. 12/435,767, Non-Final Office Action dated Sep. 17, 2012, 26 pages.
U.S. Appl. No. 12/435,767, Notice of Allowance dated Dec. 18, 2015, 5 pages.
U.S. Appl. No. 12/435,774, Advisory Action dated Apr. 9, 2014, 3 pages.
U.S. Appl. No. 12/435,774, Advisory Action dated Dec. 21, 2016, 3 pages.
U.S. Appl. No. 12/435,774, Advisory Action dated Mar. 3, 2016, 3 pages.
U.S. Appl. No. 12/435,774, Advisory Action dated Nov. 7, 2012, 3 pages.
U.S. Appl. No. 12/435,774, Final Office Action dated Nov. 9, 2011, 12 pages.
U.S. Appl. No. 12/435,774, Final Office Action dated Dec. 23, 2015, 14 pages.
U.S. Appl. No. 12/435,774, Final Office Action dated Jan. 23, 2015, 14 pages.
U.S. Appl. No. 12/435,774, Final Office Action dated Oct. 12, 2016, 14 pages.
U.S. Appl. No. 12/435,774, Final Office Action dated Aug. 30, 2012, 15 pages.
U.S. Appl. No. 12/435,774, Final Office Action dated Jan. 27, 2014, 16 pages.
U.S. Appl. No. 12/435,774, Non-Final Office Action dated May 13, 2011, 13 pages.
U.S. Appl. No. 12/435,774, Non-Final Office Action dated Aug. 19, 2015, 15 pages.
U.S. Appl. No. 12/435,774, Non-Final Office Action dated May 10, 2012, 15 pages.
U.S. Appl. No. 12/435,774, Non-Final Office Action dated Sep. 8, 2014, 15 pages.
U.S. Appl. No. 12/435,774, Non-Final Office Action dated Jul. 30, 2013, 16 pages.
U.S. Appl. No. 12/435,774, Non-Final Office Action dated Jun. 13, 2016, 17 pages.
U.S. Appl. No. 13/287,535, Advisory Action dated Nov. 5, 2012, 2 pages.
U.S. Appl. No. 13/287,535, Advisory Action dated Apr. 1, 2014, 3 pages.
U.S. Appl. No. 13/287,535, Advisory Action dated Dec. 22, 2016, 3 pages.
U.S. Appl. No. 13/287,535, Advisory Action dated Mar. 2, 2016, 3 pages.
U.S. Appl. No. 13/287,535, Applicant Initiated Interview Summary dated Sep. 20, 2017, 3 pages.
U.S. Appl. No. 13/287,535, Final Office Action dated Aug. 17, 2012, 10 pages.
U.S. Appl. No. 13/287,535, Final Office Action dated Dec. 23, 2015, 10 pages.
U.S. Appl. No. 13/287,535, Final Office Action dated Jan. 22, 2014, 10 pages.
U.S. Appl. No. 13/287,535, Final Office Action dated Jan. 23, 2015, 10 pages.
U.S. Appl. No. 13/287,535, Final Office Action dated Oct. 12, 2016, 11 pages.
U.S. Appl. No. 13/287,535, Final Office Action dated May 11, 2012, 9 pages.
U.S. Appl. No. 13/287,535, Non-Final Office Action dated Jul. 18, 2013, 10 pages.
U.S. Appl. No. 13/287,535, Non-Final Office Action dated Mar. 30, 2017, 10 pages.
U.S. Appl. No. 13/287,535, Non-Final Office Action dated Jun. 10, 2016, 11 pages.
U.S. Appl. No. 13/287,535, Non-Final Office Action dated Sep. 10, 2014, 12 pages.
U.S. Appl. No. 13/287,535, Non-Final Office Action dated Aug. 12, 2015, 9 pages.
U.S. Appl. No. 13/287,535, Non-Final Office Action dated Dec. 30, 2011, 9 pages.
U.S. Appl. No. 13/287,568, Advisory Action dated Jun. 3, 2014, 3 pages.
U.S. Appl. No. 13/287,568, Applicant Initiated Interview Summary dated Sep. 5, 2017, 3 pages.
U.S. Appl. No. 13/287,568, Final Office Action dated Jul. 7, 2017, 18 pages.
U.S. Appl. No. 13/287,568, Final Office Action dated Aug. 6, 2015, 19 pages.
U.S. Appl. No. 13/287,568, Final Office Action dated Mar. 13, 2014, 19 pages.
U.S. Appl. No. 13/287,568, Final Office Action dated Apr. 27, 2012, 25 pages.
U.S. Appl. No. 13/287,568, Final Office Action dated Nov. 10, 2016, 7 pages.

(56) References Cited

OTHER PUBLICATIONS

U.S. Appl. No. 13/287,568, Non-Final Office Action dated Feb. 20, 2015, 18 pages.
U.S. Appl. No. 13/287,568, Non-Final Office Action dated Oct. 1, 2013, 18 pages.
U.S. Appl. No. 13/287,568, Non-Final Office Action dated Jan. 3, 2012, 20 pages.
U.S. Appl. No. 13/287,568, Non-Final Office Action dated Apr. 29, 2016, 23 pages.
U.S. Appl. No. 13/287,568, Non-Final Office Action dated Feb. 1, 2017, 25 pages.
U.S. Appl. No. 13/287,535, Notice of Allowance dated Nov. 29, 2017, 16 pages.
U.S. Appl. No. 13/287,568, Non-Final Office Action dated Jul. 6, 2018, 33 pages.

* cited by examiner

SYSTEM AND METHOD FOR CONTENT SELECTION FOR WEB PAGE INDEXING

FIELD OF THE INVENTION

This disclosure relates to a system and method for indexing of web pages, and in particular for indexing web pages based on sections of a document.

BACKGROUND OF THE INVENTION

When a search engine performs a search of web pages on the internet, the search engine uses an index of web pages to determine those web pages that match the search terms entered by a user. A problem with current indexing methods, is that the indexing is typically performed across an entire document (i.e. web page) so that a web page will be determined to be a match if the entered search terms appear anywhere in the document. Often, when a user enters multiple search terms, the search results will include documents in which the multiple terms are found but in unrelated parts of the document. This problem is exacerbated because the raw markup content of a document observed by the search engine may locate words of unrelated areas, such as side menus and the like, in proximity to content of the primary material of the document, thereby reducing the effectiveness of search term proximity searches. This can lead to content being erroneously related in the index and to non-meaningful content, such as link lists etc being included in the index.

What is required is a system, method and computer readable medium that is able to provide improved document indexing.

SUMMARY OF THE INVENTION

In one aspect of the disclosure, there is provided a method for indexing a document comprising determining indexable content of the document and indexing the indexable content. Determining the indexable content comprises dividing the document into a plurality of document elements, determining an attention history for a plurality of the document elements, and determining one or more document elements that meet an attention history requirement.

In one aspect of the disclosure, there is provided a system for indexing web pages comprising a content selection module and an indexing module. The content selection module processes interaction data for a web page to select indexable content of the web page and the indexing module indexes the indexable content of the web page.

In one aspect of the disclosure, there is provided a computer-readable medium comprising computer-executable instructions for execution by a processor, that, when executed, cause the processor to determine interaction data for a web page, determine a document object model element of the web page associated with the interaction data, and add the document object model element to a set of indexable content for the web page.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
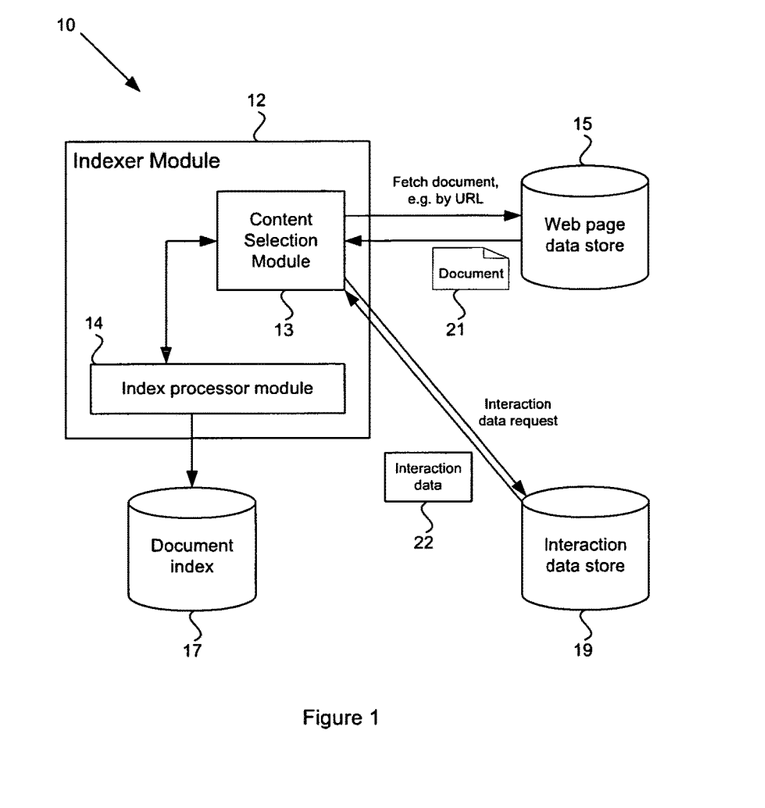
FIG. 1 illustrates a system for indexing documents.

In FIG. 1, there is shown a system 10 for providing web page indexing. The system 10 includes an indexer module 12, a web page data store 15, an interaction data store 19 and a document index 17. The indexer module 12 performs indexing of documents, e.g. web pages of the web page data store 15. In the embodiment shown, the web page data store is primarily a web page repository but may be any arbitrary document store.

The indexer module 12 includes a content selection module 13 and an index processor module 14.

In a web page indexing embodiment, the document index 17 is a searchable database that stores correlations between URLs and various content elements, search terms etc for the URL. In alternative embodiments, the document index may similarly index many different document types.

The interaction data store stores interaction data for various web pages. The interaction data represents an attention history for web pages and may include user interface events and attention data from past interactions with documents and web pages, such as described in the Applicant's co-pending patent application Ser. No. 12/435,767, filed May 5, 2009, the entire contents of which are herein incorporated by reference. As described in referenced patent application, in typical webpage protocols, a document object model (DOM) of a webpage structure may include a document, a body and several elements, including elements embedded within each other. Events, in particular user triggered events such as mouse movements, cursor movements, mouse clicks or keyboard events may be generated at various locations on the page. Application code, e.g. javascript applications, running in the webpage environment may register event handlers on various web page objects. The event handlers may handle events in a variety of ways. A first event handling method is referred to as event capturing. Event capturing provides an event first to the top most object in the web page hierarchical structure, i.e. DOM, and onward in a descending fashion as follows:

DOCUMENT→BODY→ELEMENT A→ELEMENT B

Event bubbling provides an event first to the bottom most object and onward in an ascending fashion as follows:

ELEMENT B→ELEMENT A→BODY→DOCUMENT

As described in the Applicant's co-pending application Ser. No. 12,435,767, filed May 5, 2009, referenced above, event streams may be recorded during an interaction between a user and a particular web page. These event streams may be analyzed, in conjunction with the DOM structure, to determine if the event streams represent user attention events for the respective document elements during the user interaction. A statistical analysis may be performed across multiple interactions for a document or URL to form the interaction data of the interaction data store 19. That is, the interaction data comprises statistical data that associates the elements of a document or web page (e.g. DOM elements) with the amount of attention, in particular human-dependent attention, that the respective document element receives during user interactions. Attention events may include not only blatant events such as complete mouse clicks, but also inferred attention events such as partial mouse clicks, mouse moves, hovers, lingers and hints, as described in the Applicant's co-pending application Ser. No. 12/435,767, filed May 5, 2009, referenced above.

Figure 2:
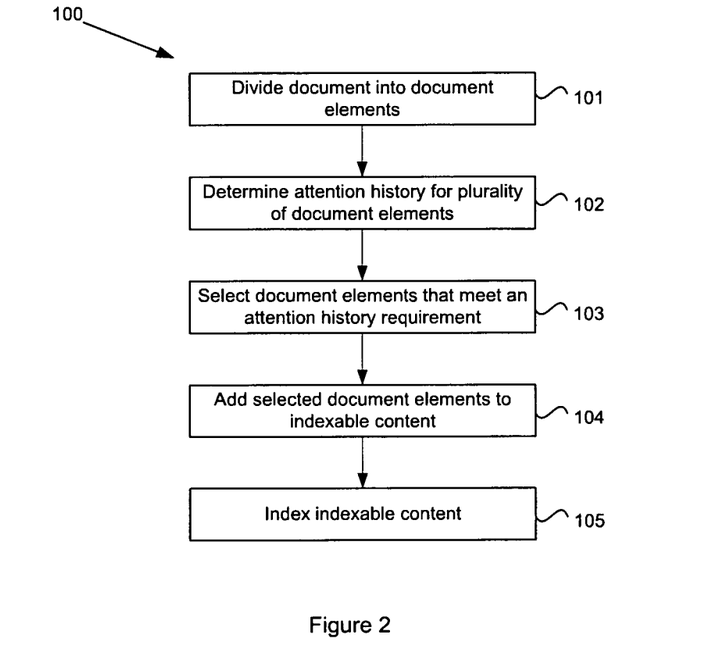
FIG. 2 illustrates a method for indexing documents.

A method for indexing documents is illustrated in the flowchart 100 of FIG. 2. At step 101, a document is divided into document elements. Attention history for the document elements is then determined 102 and document elements that meet an attention history requirement are selected 103 for adding to indexable content of the document 104. The indexable content is then indexed 105.

The content selection process of the indexer module 12 will now be described with reference to FIG. 1 and the flowchart 200 of FIG. 3. At step 201, the content selection module 13 sends a fetch document request to the web page data store 15. For example, the content selection module 13 may request a document by providing the URL for the document to the web page data store 15, which returns the document 21 matching the URL to the content selection module 13. The URL may be selected from an indexing schedule, controlled by the indexing module or other components of a search engine or web crawler. For example, new URLs may be determined by a web crawler, the content of the URLs may be downloaded to the web page data store 15 and the URL may be scheduled for indexing. Similarly, known and existing URLs may be periodically scheduled for indexing in order to ensure that document index is maintained up to date.

At step 202, the content selection module 13 requests interaction data for the document 21, e.g. by URL, from the interaction data store 19. If no interaction data exists for the URL, as determined at step 203, then the content selection module passes all elements of the document 21 to the index processor module 14 (step 210) where the document is indexed based on the entire contents of the document.

If the URL has associated interaction data 22, then the document is divided into its document object elements and the content selection module 13 retrieves the DOM element IDs for all interactions from the interaction data store (step 204). The content selection module 13 then analyzes each of the DOM elements of the web page. After selecting an initial DOM element of the web page (step 205), the content selection module determines if the selected DOM element is found in the interaction data set of DOM element IDs (step 206). If the DOM element has no interaction data, then the content selection module returns to step 204 where a next DOM element is selected for the web page. If interaction data does exist for the DOM element, then a threshold requirement may optionally be applied (step 207). That is, the interaction data for the DOM element may be analyzed to determine if the DOM element receives attention events above a threshold level. In one embodiment, the threshold may be limited to only human classified attention events. If the DOM element does not meet the optional threshold requirements, then the DOM element may be ignored and a next DOM element may be selected.

As described in the Applicant's co-pending patent application Ser. No. 12/435,767, filed May 5, 2009, referenced above, over multiple retrievals a web page or document may exist in multiple instances having different content elements, such as updatable sections or contextually placed elements. Therefore, the DOM elements for a document, and the content (e.g. text) within them, may not be consistent across all interactions. In one embodiment the DOM element identifiers include a locality sensitive hash (LSH) code such as Nilsimsa digest as described in the aforementioned reference. The result is that DOM elements with nearly equivalent content have nearly equivalent LSH codes in their DOM element identifiers. Two DOM elements, from different interactions, may be analyzed as being the same if they have sufficiently similar LSH codes.

If the DOM element satisfies the threshold requirements, or if no threshold requirements are applied, then the DOM element is added to the indexable content for the web page (step 208). If further DOM elements are to be analyzed, then the process returns to step 204 and a next DOM element is selected. Once all DOM elements of the web page have been analyzed, the content selection module 13 outputs the total indexable content to the index processor module 14 (step 209). The index processor module 14 then performs a routine indexing for the web page, typically as an inverted index, but using only those elements of the web page that are provided in the indexable content. The output of the index processor module is used to add to or update the document index 17. The index built is typically an inverted index that maps words to the documents that they occur in. An inverted index may also include information about (i) the frequency of each word within each document and (ii) the positions of each word within each document. Indexing methods are known in the art and the particular indexing method is not considered relevant to the present embodiments. Thus no further description of particular indexing methods is provided here.

In one alternative embodiment, document elements with no interaction data may be added to the indexable content, thus allowing these elements to be indexed and potentially driving traffic towards those elements. However, these elements may be flagged and if no interaction data exists at the next indexing of the web page, then content for these elements may be dropped from the index. Indexing of a document may include updating the index to remove index entries that are no longer relevant as determined by the attention data.

In one embodiment, outclick events may be excluded from consideration as these types of events indicate the attention of a user shifting away from the web page.

In the embodiments described with reference to FIGS. 2 and 3, the document is processed as if it were one entire section. In an alternative embodiment, described with reference to the flowchart 300 of FIG. 4, the document may be first divided into sections 301. Each section may be divided into its respective one or more document elements 302. Identified sections are mutually disjoint (i.e. non-overlapping with respect to content and elements). Each identified section may be processed as a complete document, similar to the method described above with reference to FIG. 2, with the content in each section being segregated from other section content when it is indexed. That is, at step 303, the attention history for the elements of a section is determined and the elements that meet an attention history requirement are selected at step 304. The selected elements are added to the indexable content for the respective document section (305). Each section that has indexable content can then be indexed at step 306.

Figure 3:
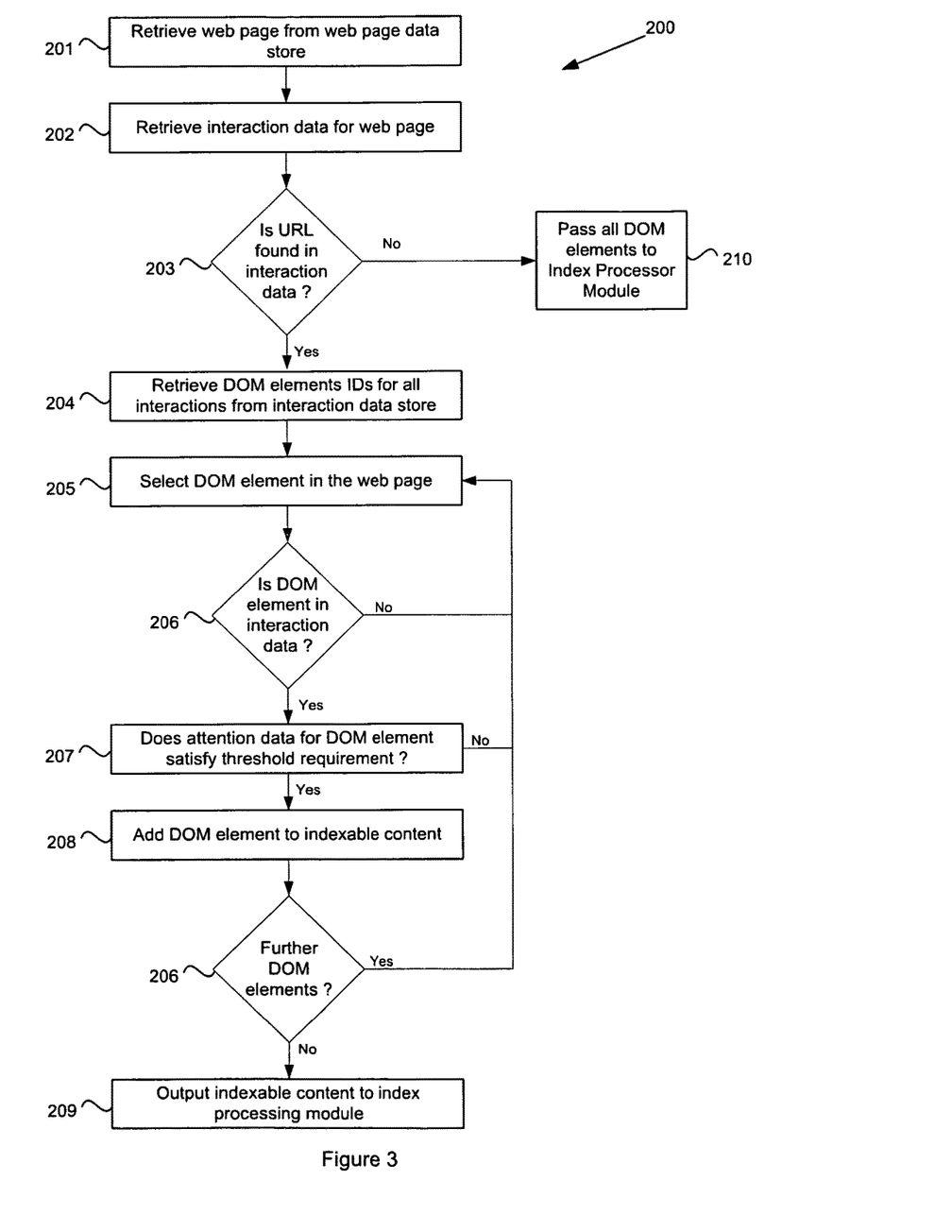
FIG. 3 illustrates a content selection process.
Figure 4:
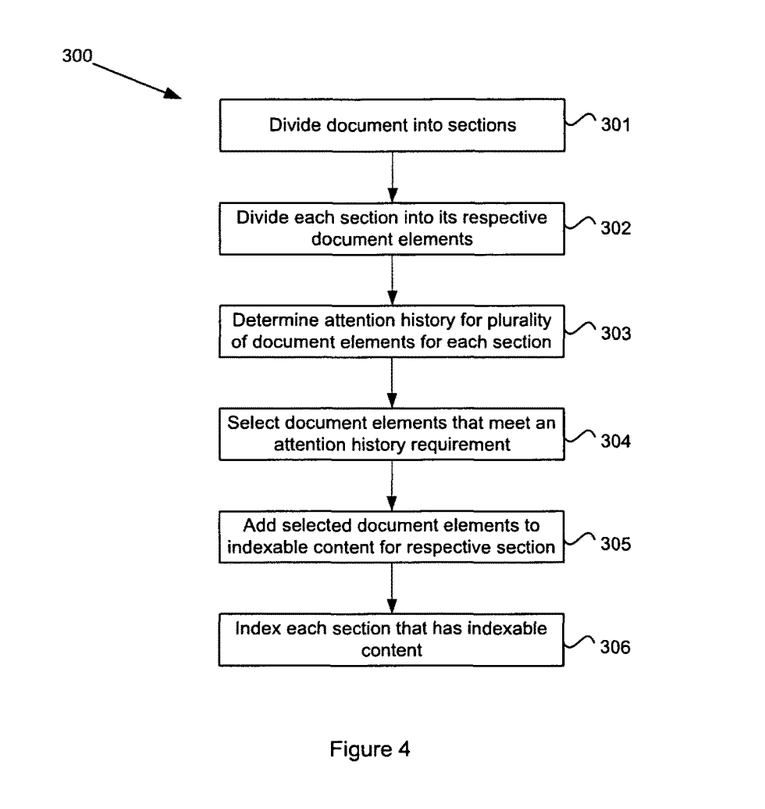
FIG. 4 illustrates a method for indexing document sections.

The process 200 of FIG. 3 performed by the content selection module 13 may be modified by including a section analysis step, e.g. prior to step 204, and then performing the steps 204 to 209 on a section by section basis. The section analysis step may be performed "on the fly" or may be performed by retrieving historical section analysis data, e.g.

from the interaction data store 19 or another suitable data store. Further description of the section analysis is provided in greater detail below.

In the embodiments of FIGS. 2 and 3, when indexing a URL, the index processor module 14 requests a URL from the content selection module 13 and gets back a single document, albeit only threshold relevant document elements. However, for embodiments the URL document has been divided into sections, different sets of document elements are identified as being co-relevant and these document element sets (sections) are processed independently. For the index processor module 13 this means requesting a single URL and receiving back multiple "documents" to be indexed. These "documents" are subsets (sections) of the document that was retrieved from the web page data store.

The embodiments above demonstrate a system in which only the elements of a web page that have sufficient human attention data, as measured via events, are used to index the web page. Furthermore, different sections of a document, as identified by analysis of the interaction data, are indexed separately. By separating the web page into sections for indexing purposes, several benefits may be achieved. One advantage is that subareas of web pages that do not receive at least a certain level of attention are not indexed, thereby reducing search engine spam.

Figure 5:
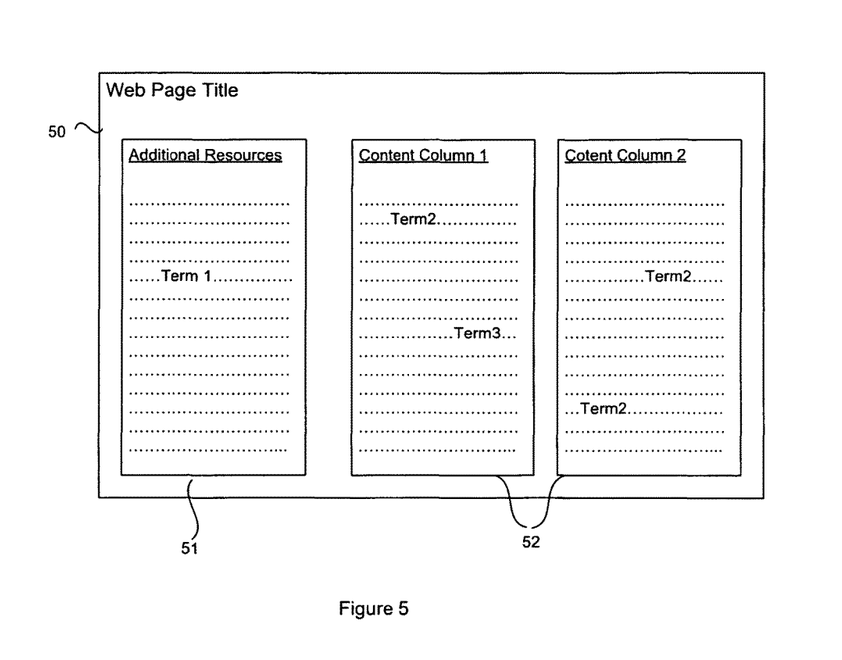
FIG. 5 illustrates a search engine example.

A further advantage is that the relevance of search results may be improved. For example, a simple three column web page 50 is shown in FIG. 5. In this web page, the left most column 51 contains titles and links to other articles while the rightmost two columns 52 contain the article/content for the web page 50. It is understood that sections 51, 52 are each comprised of several DOM elements. In this example, the set of DOM elements 51 contain the term "Term1" and the set of DOM elements 52 contain the terms "Term2" and "Term3".

The aggregate event and attention data for this web page may reveal at least two basic patterns of interaction:
1) visitors who spend their interaction time on the right most columns 52, presumably having found the content of interest; and
2) visitors who only briefly focus on the rightmost columns and then interact with the left column 51 and exit, presumably in search of content of more relevant interest than the content found in the rightmost columns 52.

In the above described embodiments, these two clearly distinguished sections would be treated as completely separate "documents" for indexing purposes. That is, during indexing, the content of the leftmost column would be indexed (containing "Term1" but not "Term2" or "Term3"). Then separately the rightmost two columns would be indexed (containing "Term2" and "Term3" but not "Term1"). For both of these indexing operations we presume that the individual DOM elements containing the terms did receive enough attention to meet the threshold requirements.

A user may enter search terms such as Term1 and Term2 into a search engine. Under prior art indexing arrangements, the search engine would indicate this URL as having a match, and thus as relevant, to the search because the URL was indexed for both Term1 and Term2 (the entire document). However, it is clear in this example that the context of these terms shows the document is not relevant to a search for both of Term1 and Term2 because there is no actual content for Term1 in the main content section 52. In the indexing arrangement of the present disclosure, the URL representing the document would not be indicated as relevant for a search using Term1 and Term2 as search terms. This is because Term1 would be indexed to the URL with the rest of the content of section 51. Separately, Term2 and Term3 would be indexed to the URL with the content of section 52. A search for terms Term2 and Term3 would however indicate this URL as relevant, as these terms both appear in the same section of the document considered to be indexable by the content selection module 13. Thus the present embodiments can be used to enhance search engine performance by removing irrelevant URLs from the list of search results.

Most indexing methods use the URL as a unique identifier for the terms indexed (e.g. in an inverted index). To maintain separation of each section's content the Content Selection Processor 13 may optionally associate a distinct URL with each identified section of a web page. These per-section URLs may be a modification of the document URL via adding a prefix, a suffix, or any other suitable alteration so that (i) the Index Processor Module will process each section as a separate distinct "document" and (ii) the modification can be reversed as needed so the user can see the document URL in search results lists.

It is the job of section analysis to determine how many sections a document has. As described in the Applicant's co-pending patent application Ser. No. 12/435,767, filed May 5, 2009, low level interaction event data and the higher level attention analysis data (hints, lingers, hovers, etc.) are available in the Interaction Data Store 19. Both data is DOM element centric, though the attention data may have a source and destination element. Section analysis is the process of performing statistical analysis on aggregate interaction data in order to subdivide the document based on interaction types. Section analysis may consider all the DOM elements receiving attention (and optionally interaction events) for individual interactions. For example, there may be 100 interactions of the sample page of FIG. 5. Section analysis observes that $20/100$ interactions spend 98% of the attention in the set of DOM elements comprising the left column 51. Further, $72/100$ interactions spend at least 84% of the attention within the set of DOM elements comprising the rightmost two columns 52. The remaining $8/100$ interactions in our example do not show a preference for a sub-area of the document during the interaction. In this example section analysis determines that the document has two sections based on the aggregate interaction patterns. The sections are the DOM elements (and content) comprising 51 and the DOM elements (and content) comprising 52. Though the section analysis is described herein as occurring during content selection, the section analysis can also be performed by various means (e.g. offline) and in one embodiment, the results of section analysis may already be stored within the interaction data store along with the attention data and the interaction event data.

A further advantage of the present embodiments is that by removing from indexing the content found in DOM elements that do not meet threshold levels of interest (individually or by sections), less text is indexed per document which leads to smaller indexes and faster search engines. Identifying and not indexing content can also prevent several types of "spamdexing" where content is created to be seen by web crawlers but not by humans. Because the indexing arrangement of the present embodiments relies on human dependent interactions with a web page, any content that is not seen by humans will eventually be dropped from the indexing such that the spamdexing strategy becomes ineffective. One example of spamdexing is where the same color is used for the document background and for some "spam text" that is meant only for web-crawlers and search engines. The lack of human attention on such an element will result in it not meeting the threshold criteria and it will not be indexed.

In one embodiment, the indexer module 12 may be embodied within a search engine (not shown). Alternatively or in addition, the indexer module may be provided as a third party service to a search engine or web server.

In the Applicant's co-pending patent application Ser. No. 12/435,774, filed May 5, 2009, the entire contents of which are herein incorporated by reference, there is described a web crawler that selects URLs for document retrieval and storage in a web page data repository dependent on whether the URL or the URL's document contains human-dependent interaction data. In the present embodiments, if documents are located using a web crawler such as described in the Applicant's co-pending application referenced above, some pre-filtering of stored document elements may have already been applied.

The components of the system 10 such as the indexer module 12, web page data store 15, interaction data store 19 etc. may be provided within a single computer system or may be provided in a distributed manner with suitable communications links between modules and components. In various embodiments, data services such as the interaction data store 19 and web page data store 15 may be provided as third party data services to the indexer module 12.

Figure 6:
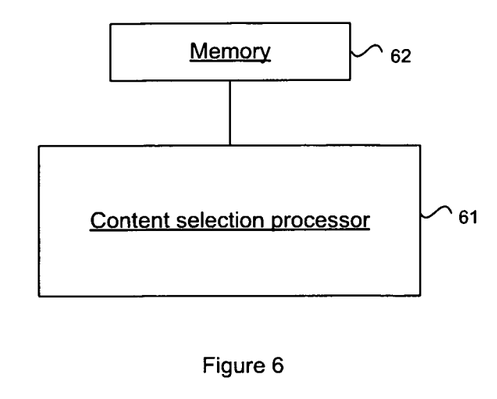
FIG. 6 illustrates a processor and memory of a content selection module.
Figure 7:
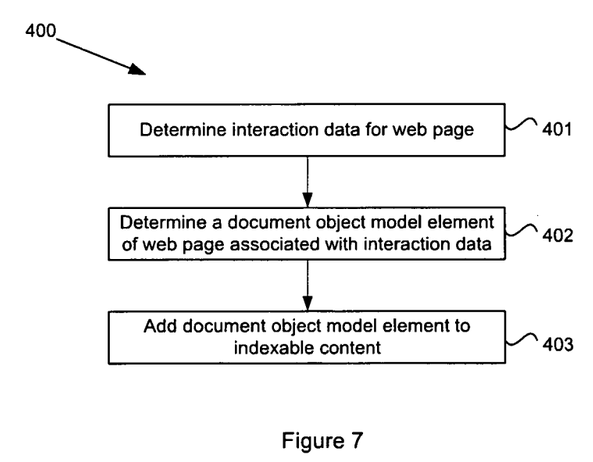
FIG. 7 illustrates an instruction set that may be executed on the processor and memory of FIG. 6.
Figure 8:
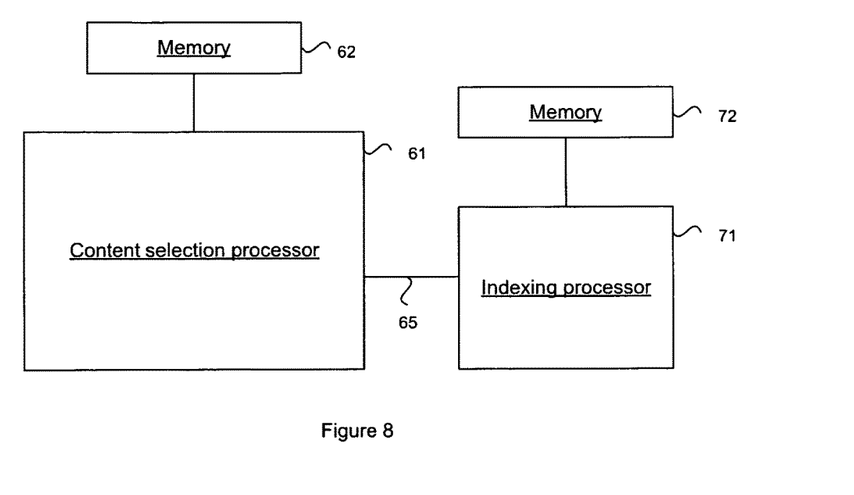
FIG. 8 illustrates the processor and memory of FIG. 6 in association with a processor and memory of a indexing module.

In one embodiment, the content selection module 13 may include a processor 61 operatively associated with a memory 62 as shown in FIG. 6. The memory 62 may store instructions that are executable on the processor 61. In addition, the memory 62 may provide elements of the interaction data store 19 or web page data store 15. An instruction set 400 that may be executed on the content selection processor 61 is depicted in the flowchart of FIG. 7. Specifically, when executed, the instruction set 400 allows the processor to determine interaction data for a web page (401), determine a document object element of the web page associated with the interaction data (402), and add the document object element to a set of indexable content for the web page. By executing the instruction set 400, the processor is able to transform the contents of a document into a smaller subset of the document for indexing. The indexable content of the document may be passed to a second processor, such as a processor 71 of an indexing module 14 shown in FIG. 8, through a suitable communications link 65. The indexing module processor 71 may be operatively associated with a memory 72 which may store an executable instruction set, which, when executed, may cause the indexing module processor 71 to receive the indexable content from the content selection processor 61 through the communications link 65 and to index the indexable content. The memory 72 may provide elements of the document index 17 which receives updated index data from the processor 71. Alternatively, the document index 17 may be provided by a database (not shown) in operative association with the indexing module processor 71 which may be transformed by the indexing module processor 71 when new or amended indexing data is generated.

While specific reference has been made herein to indexing of web pages, a person skilled in the art will readily understand that the systems and methods described herein may be used to index and search on many different document types and all such document types are intended to be embraced herein. For example, documents may have a variety of divisions (such as chapters, pages, etc) that can be indexed concomitant with sections and elements identified for indexing based on user attention attracted to the sections and elements.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for indexing a webpage comprising:
retrieving, by an indexer server, a plurality webpages to be indexed from a webpage data store, wherein the indexer server comprises one or more computer systems configured to performing indexing of webpage documents within the webpage data store;
determining, by the indexer server, for each of the plurality of webpages, a document object model (DOM) containing one or more DOM elements within each webpage;
computing, by the indexer server, a DOM element identifier for each of the one or more DOM elements within each of the plurality of webpages, wherein each DOM element identifier is computed based on the content within the corresponding DOM element;
determining, by the indexer server, a first subset of the plurality of DOM elements having DOM element identifiers that satisfy a content similarity threshold to the DOM element identifiers of the other DOM elements;
retrieving attention history data associated with each of the first subset of DOM elements, wherein the attention history data for each particular DOM element is based on previous user interface events detected within the particular DOM element;
combining the attention history data associated with each of the first subset of DOM elements, and comparing the combined attention history data to an attention history threshold level; and
in response to a determination that the combined attention history data associated with the first subset of DOM elements meets the attention history threshold level, indexing, by the indexer server, each of the first subset of DOM elements.

2. The method according to claim 1 wherein retrieving attention history data associated with each of the first subset of DOM elements comprises retrieving the attention history data from an interaction data store.

3. The method according to claim 1 wherein the attention history data comprises interaction data that associates a document object model element with attention that the document object model element received from a user during an interaction with the webpage.

4. The method according to claim 1 wherein the attention history threshold level comprises a requirement that the combination of the first subset of document object model elements has at least one associated attention event.

5. The method according to claim 1 wherein the attention history threshold level comprises a requirement that the combination of the first subset of document object model elements has at least a threshold number of associated attention events.

6. The method according to claim 1, further comprising retrieving section analysis data from a database, for each of the plurality of webpages.

7. The method according to claim 1, further comprising:
identifying a first particular document object model element within the first subset of DOM elements, wherein the first particular document object model element is included within multiple of the plurality of webpages, and wherein the comparing the combined attention history data associated with the first subset of DOM elements to the attention history threshold level comprises summing the previous user interface events detected within the particular document object model element over the multiple webpages.

8. The method according to claim 1,
wherein each of the plurality of DOM element identifiers is computed using a hash function on the content of the DOM element.

9. The method according to claim 8,
wherein retrieving the attention history data for each of the first subset of DOM elements comprises excluding outclick events from the attention history data prior to the comparison to the attention history threshold level.

10. A system for indexing web pages comprising:
an indexer server comprising one or more processors, and memory storing computer-readable instructions that, when executed by the one or more processors, cause the indexer server to execute a content selection module programmed to:
retrieve a plurality of webpages from a webpage data store to be indexed;
determine, for each of the plurality of webpages to be indexed, a document object model (DOM) containing one or more DOM elements within each webpage;
compute a DOM element identifier for each of the one or more DOM elements within each of the plurality of webpages, wherein each DOM element identifier is computed based on the content within the corresponding DOM element;
determine a first subset of the plurality of DOM elements having DOM element identifiers that satisfy a content similarity threshold to the DOM element identifiers of the other DOM elements;
retrieve attention history data associated with each of the first subset of DOM elements, wherein the attention history data for each particular DOM element is based on previous user interface events detected within the particular DOM element;
combine the attention history data associated with each of the first subset of DOM elements, and compare the combined attention history data to an attention history threshold level; and
in response to a determination that the combined attention history data associated with the first subset of DOM elements meets the attention history threshold level, provide each of the first subset of DOM elements to an indexing module programmed to index the received first subset of DOM elements.

11. The system according to claim 10, further comprising an interaction data store that stores interaction data for the plurality of web pages.

12. The system according to claim 10 wherein the content selection module adds content of the first subset of DOM elements to the indexable content if the interaction data associated with the first subset of DOM elements comprises a plurality of attention events associated with the content and if the number of attention events are above a threshold number.

13. The system according to claim 12 wherein the interaction data comprises at least one association between the first subset of document object model elements and one or more attention events generated by a human user during an interaction with the first subset of document object model elements.

14. The system according to claim 13 wherein the one or more attention events indicate regions within the plurality of web pages of interest to a human user during an interaction with the plurality of web pages.

15. The system according to claim 10, wherein retrieving the attention history data for each of the first subset of DOM elements comprises excluding outclick events from the attention history data prior to the comparison to the attention history threshold level.

16. A non-transitory computer-readable medium comprising computer-executable instructions for execution by a processor, that, when executed, cause the processor to:
retrieve a plurality of webpages from a webpage data store to be indexed;
determine, for each of the plurality of webpages to be indexed, a document object model (DOM) containing one or more DOM elements within each webpage;
compute a DOM element identifier for each of the one or more DOM elements within each of the plurality of webpages, wherein each DOM element identifier is computed based on the content within the corresponding DOM element;
determine a first subset of the plurality of DOM elements having DOM element identifiers that satisfy a content similarity threshold to the DOM element identifiers of the other DOM elements;
retrieve attention history data associated with each of the first subset of DOM elements, wherein the attention history data for each particular DOM element is based on previous user interface events detected within the particular DOM element;
combine the attention history data associated with each of the first subset of DOM elements, and compare the combined attention history data to an attention history threshold level; and
in response to a determination that the combined attention history data associated with the first subset of DOM elements meets the attention history threshold level, indexing each of the first subset of DOM elements.

17. The non-transitory computer-readable medium of claim 16, wherein retrieving attention history data associated with each of the first subset of DOM elements comprises retrieving the attention history data from an interaction data store.

18. The non-transitory computer-readable medium of claim 16, wherein the attention history data comprises interaction data that associates a document object model element with attention that the document object model element received from a user during an interaction with the webpage.

19. The non-transitory computer-readable medium of claim 16, wherein the attention history threshold level comprises a requirement that the combination of the first subset of document object model elements has at least one associated attention event.

20. The non-transitory computer-readable medium of claim 16, wherein the attention history threshold level comprises a requirement that the combination of the first subset of document object model elements has at least a threshold number of associated attention events.

* * * * *

UNITED STATES PATENT AND TRADEMARK OFFICE
CERTIFICATE OF CORRECTION

PATENT NO. : 10,303,722 B2
APPLICATION NO. : 12/435777
DATED : May 28, 2019
INVENTOR(S) : Hauser Page 1 of 1

It is certified that error appears in the above-identified patent and that said Letters Patent is hereby corrected as shown below:

In the Specification

In Column 2, Line 57, delete "12,435,767," and insert -- 12/435,767, --, therefor.

Signed and Sealed this
Twenty-eighth Day of July, 2020

Andrei Iancu
*Director of the United States Patent and Trademark Office*